United States Patent [19]

Loomer

[11] 4,395,181
[45] Jul. 26, 1983

[54] ROBOT VEHICLE

[75] Inventor: Weston R. Loomer, Walton, Ky.

[73] Assignee: Litton Systems, Inc., Florence, Ky.

[21] Appl. No.: 130,019

[22] Filed: Mar. 13, 1980

Related U.S. Application Data

[63] Continuation of Ser. No. 925,525, Jul. 17, 1978, abandoned, which is a continuation of Ser. No. 729,393, Oct. 4, 1976, abandoned.

[51] Int. Cl.³ ............................................. B65G 65/00
[52] U.S. Cl. ................................... 414/284; 187/9 R; 254/4 R; 254/4 B; 254/4 C; 414/273; 414/279
[58] Field of Search ........ 187/9 R; 414/284, 266-267, 414/279, 241, 253; 254/4 C, 4 R, 4.2, 4 B, 264, 46

[56] References Cited

U.S. PATENT DOCUMENTS

| 1,428,523 | 9/1922 | Barrett et al. ...................... 254/4 C |
| 1,505,645 | 8/1924 | Isaacs ................................. 254/4 R |
| 1,521,646 | 1/1925 | Perkins et al. ...................... 254/4 B |
| 1,528,749 | 3/1925 | Barrett ............................... 254/4 C |
| 1,570,639 | 1/1926 | Perkins et al. ...................... 254/4 B |
| 2,278,817 | 4/1942 | Zeindler ............................. 254/4 R |
| 3,817,407 | 6/1974 | Sgwada et al. ..................... 414/279 |
| 3,848,755 | 11/1974 | Bussienne et al. ................. 414/279 |
| 3,973,685 | 8/1976 | Loomer .............................. 414/273 |
| 4,030,703 | 6/1977 | Bissel ................................. 254/264 |

FOREIGN PATENT DOCUMENTS 112477 12/1968 Denmark .
1061502 7/1959 Fed. Rep. of Germany .

Primary Examiner—Trygve M. Blix
Assistant Examiner—R. B. Johnson
Attorney, Agent, or Firm—Morris I. Pollack

[57] ABSTRACT

A vehicle is disclosed for automatically transporting loaded pallets within a plurality of tracks forming a storage rack. The vehicle comprises a main body having a plurality of wheels extending out of the sides thereof. A lift mechanism is mounted on the main body and is extendable therefrom for raising or lowering a loaded pallet above or onto the support surface of the tracks. Each lift mechanism comprises a pair of support bars, with each bar being connected to a pair of lifters or support elements. Each pair of lifters is jointly raised and lowered by flexible chains which extend over fixed supports and a double eccentric drive mechanism located therebetween. A horizontally positioned guide wheel also extends out of each corner of the carriage to contact the track rails and center the carriage at all times on the track. The carriage and lift mechanisms are respectively driven by a pair of drive motors located on the carriage. These drive motors are operated by a control center located on the vehicle which, in turn, is powered through a cable leading to a remote power center. The cable is wound and paid out of a drum mounted on the main body. The drum is drivable in either direction of the vehicle, and includes a single helical groove for receiving the cable. The lengths of the cable and groove are dimensioned to enable the cable to wind onto the drum in a single layer.

9 Claims, 8 Drawing Figures

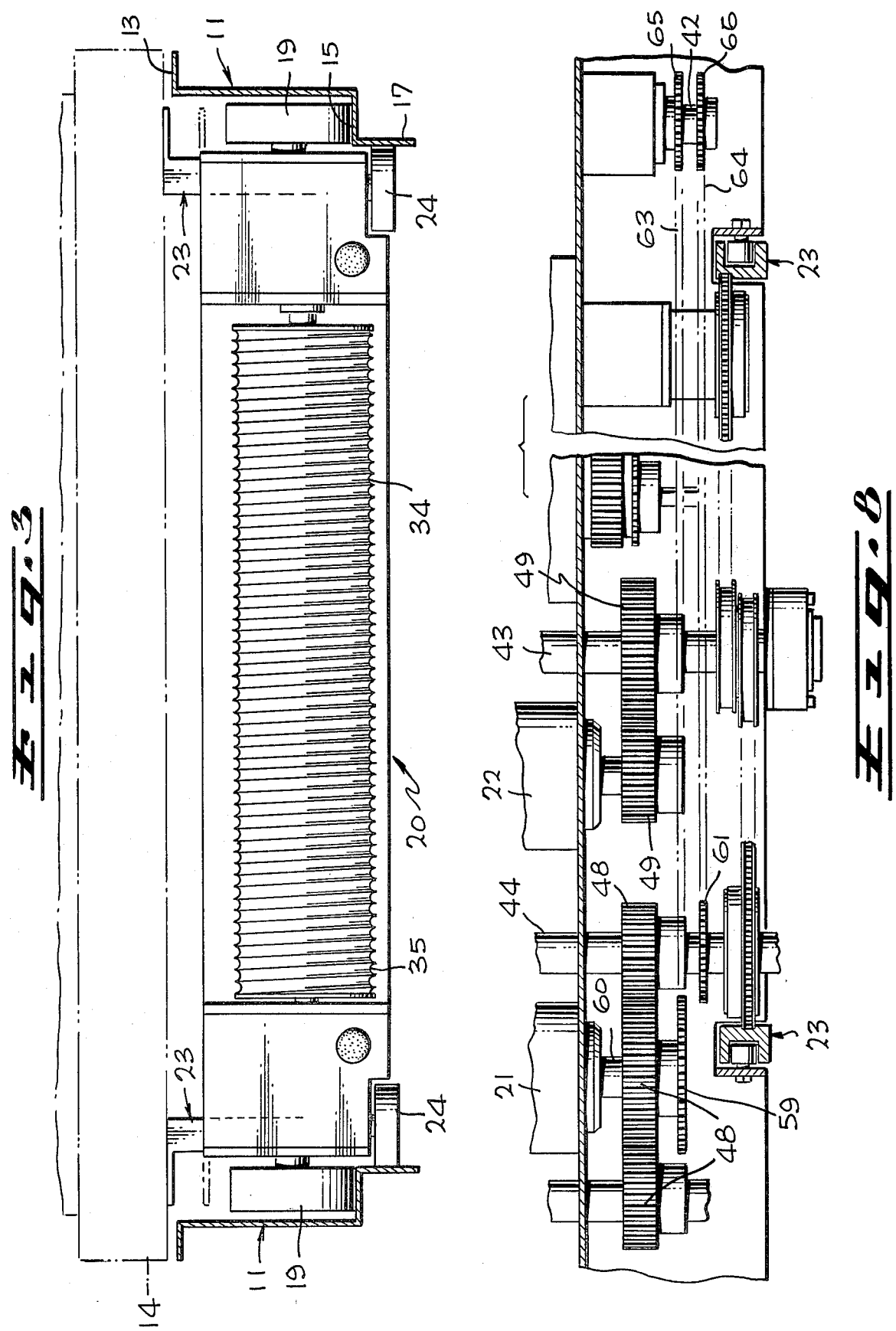

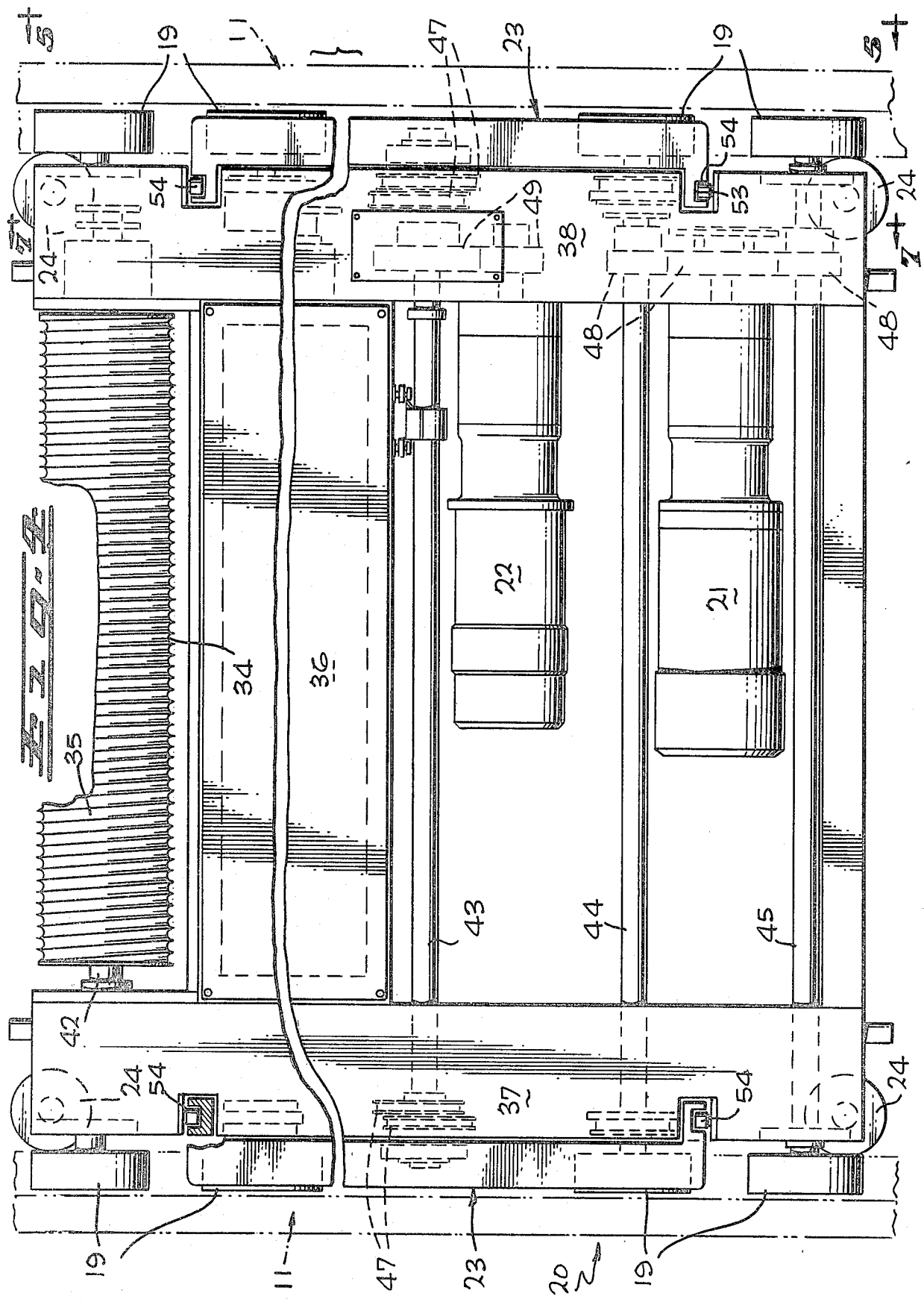

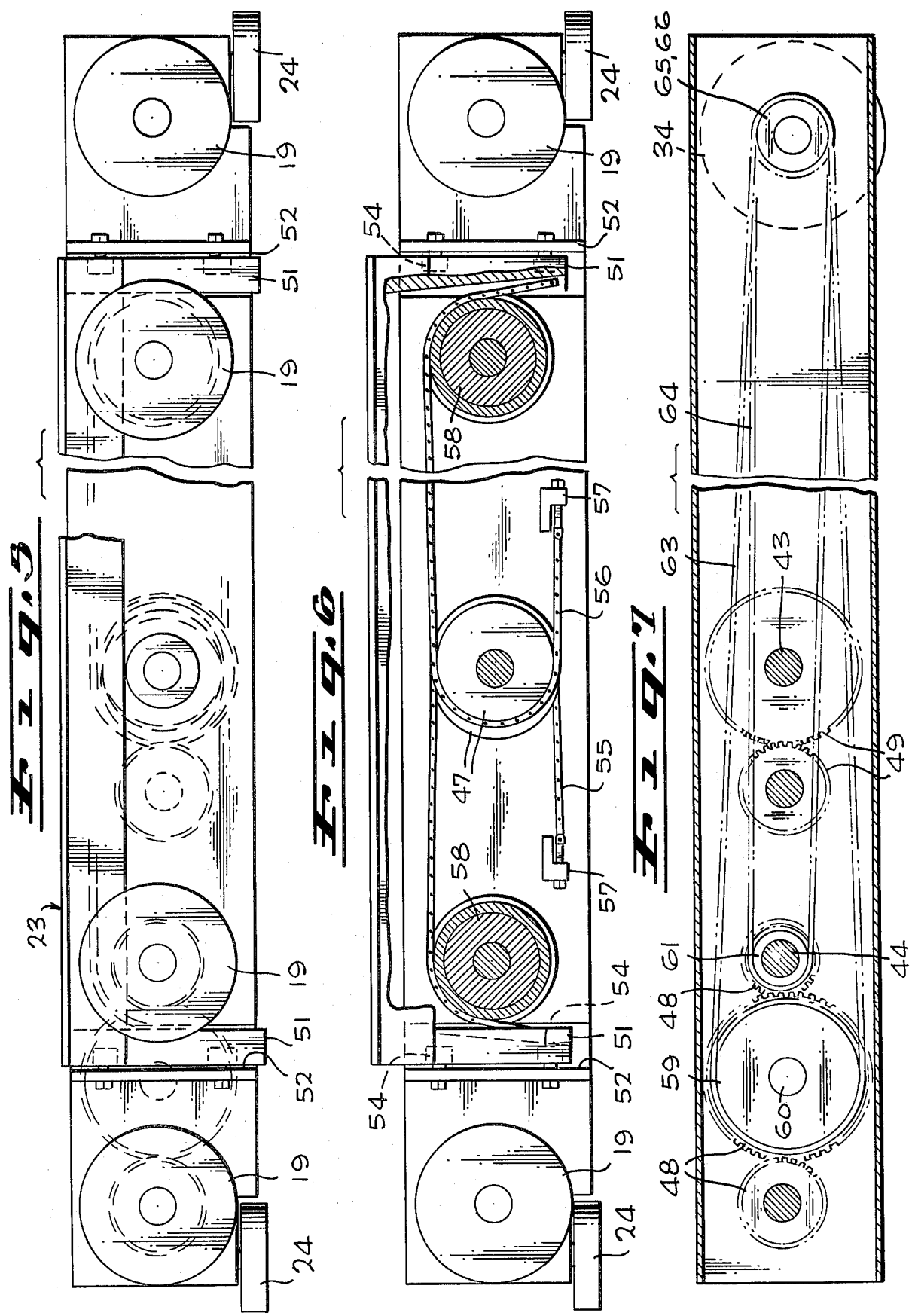

ROBOT VEHICLE

CROSS-REFERENCE TO OTHER APPLICATIONS

This application is a continuation of application Ser. No. 925,525 filed on July 17, 1978, now abandoned, which, in turn, was a continuation of application Ser. No. 729,393 filed Oct. 4, 1976, now abandoned.

SUMMARY OF THE INVENTION

The invention relates to a vehicle for an automated storage system in which the vehicle functions to transport loaded pallets within a plurality of tracks forming a storage rack. In its broadest aspect, the vehicle includes a main body having a plurality of support wheels extending out the sides thereof. A pair of extendable lift mechanisms are located on the main body for elevating the pallets above the level of the tracks during vehicle traversal and for lowering the pallets onto support surfaces formed on the tracks for storage. Each lift mechanism comprises a support bar connected to a pair of lifters or support elements mounted within the main body. A pair of eccentrics are located between each pair of lifters and are operatively connected thereto for raising and lowering the lifters. An advantage of the lift mechanism is that the drive assembly is simple in construction and operation, thereby drastically reducing the number of parts utilized.

The carriage also includes a guide wheel extending out of each corner of the main body to contact the track rails and to center the carriage on the track. An advantage of the guide wheels is that by locating the wheels at the corners of the carriage, the guide wheels are able to sense abrupt changes in the track before the loaded vehicle reaches that location.

Power to the vehicle is accomplished by a cable leading to a remote power center. The cable is wound and paid out on a drum mounted in the chassis. The drum includes a single helical groove for receiving the cable, allowing it to wind onto the drum in a single winding. An advantage of the single winding on the drum is that the simple construction eliminates the need for a complex level wind mechanism.

The features of the present invention, which are believed to be novel, are set forth with particularity in the appended Claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 3 is an elevational view partly in section of the vehicle taken along lines 3—3 of FIG. 1;

FIG. 4 is a plan view of the vehicle;

FIG. 5 is an elevational view of the vehicle taken along lines 5—5 of FIG. 4;

FIG. 6 is an elevational view similar to FIG. 5 with the side of the vehicle broken away to show the lifting mechanism structure;

FIG. 7 is an elevational view partly in section of the vehicle taken along lines 7—7 of FIG. 4; and FIG. 8 is a partial plan view partly in section of the vehicle showing the drive assembly thereof.

DESCRIPTION OF THE PREFERRED EMBODIMENT

Figure 1:
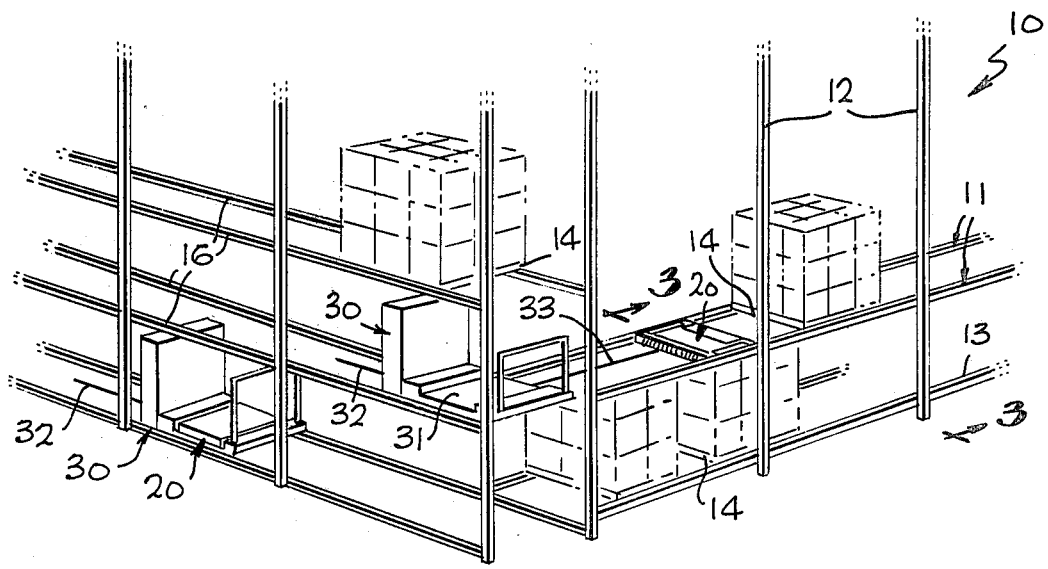
FIG. 1 is a perspective view of an automated storage system of the present invention.

Referring now to the drawings, FIG. 1 illustrates an automated storage system, generally indicated by arrow 10, comprising a storage rack formed by a plurality of horizontal rails 11 supported by vertical columns 12. Each pair of rails 11 comprise a track forming an open-faced storage compartment. The storage rack can be single or multi-tiered with the storage compartments for each tier being spaced in parallel. For illustrative purposes, only one column of storage compartments is shown, although parallel compartments are formed along the front face of the rack.

The upper surfaces 13 of the rail 11 forming each track storage compartment are adapted to support loaded pallets 14. The rails 11 also include lower rail surfaces 15 for supporting the wheels 19 of a pallet carrying vehicle 20. The vehicle 20 is adapted to ride along the rails 11 and, when empty, can move under the pallets 14 stored on the upper surfaces 13 of rails 11.

The front face of the rack includes transverse tracks 16, also supported by the vertical columns 12, for carrying a plurality of transfer carriages 30. Each transfer carriage 30 is adapted to move along a respective tier to position itself directly in front of the opening of the storage compartments on that tier. Each transfer carriage 30 includes an area 31 for receiving and transporting one of the vehicles 20.

Electrical power is supplied to the transfer carriage 30 by a cable 32 or buss bar system which is connected to a power source (not shown). Electrical power is provided to the vehicle 20 from the transfer carriage 30 via a cable 33. The cable 33 is wound about a rotatable drum 34 mounted on vehicle 20 to enable the cable 33 to be paid out as the vehicle 20 moves away from the transfer carriage 30 and into the storage compartment.

The movement and operation of the transfer carriage 30 and the vehicle 20 is controlled and governed by a central control logic 40 located in a cabinet 41 mounted on the transfer carriage 30. The central control logic 40 is equipped and programmed to feed command signals and provide power via cable 33 to an onboard control logic 36, which, in turn, functions to sequentially start and stop various motors (described hereinafter), located on the vehicle 20, to perform various operations. The central control logic 40 also controls the operation of the carriage 30.

Figure 2:
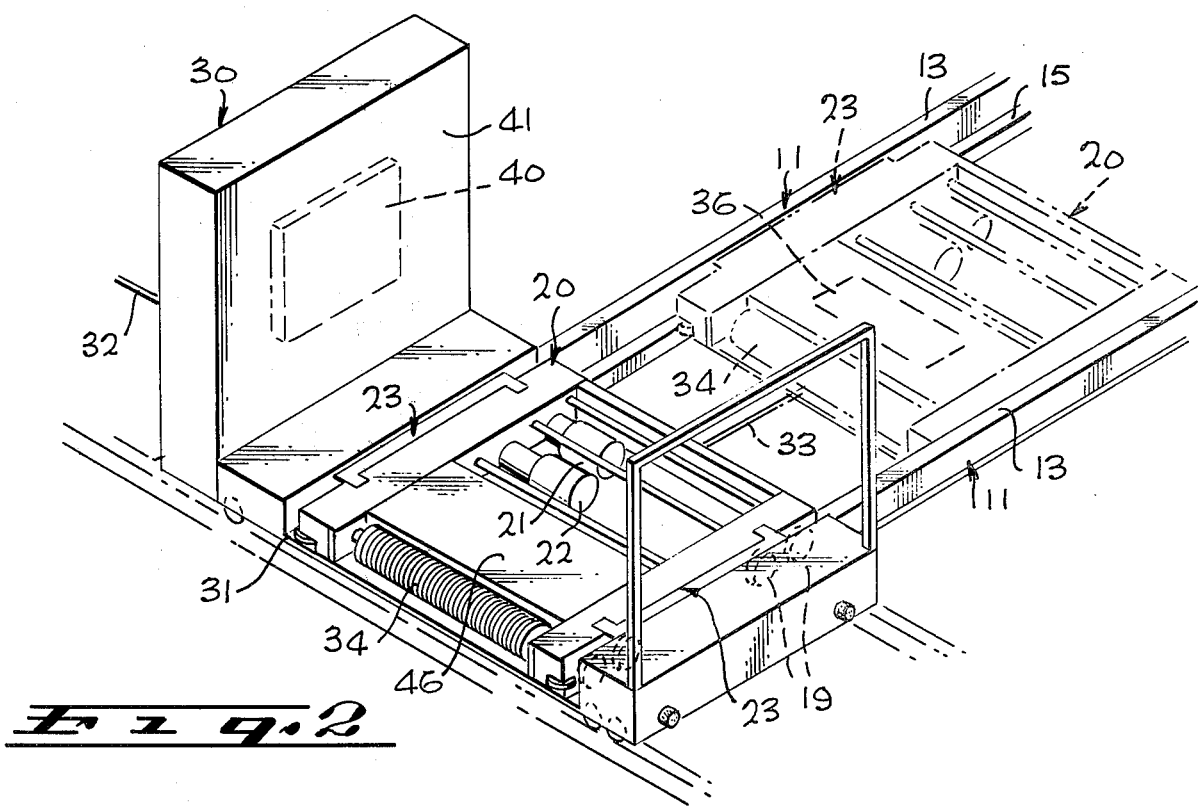
FIG. 2 is an enlarged perspective view of a transfer carriage having a pallet carrying vehicle located thereon.

As shown in FIG. 2, each vehicle 20 includes a drive motor 21 mounted therein for driving the wheels 19. The coupling between the wheels 19 and the drive motor 21 is through gear means described hereinafter.

A second drive motor 22 is also mounted in each vehicle 20 and is drivingly connected to a plurality of lift mechanisms 23 which function to raise and lower the loaded pallets 14 onto the storage tracks 11.

FIG. 3 more clearly shows the cable drum 34 which includes a single helical groove 35 for receiving the cable 33. The cable 33 is wound onto the drum 34 in a single winding along the groove 35. The drum 34 functions to pay out the cable 33 from the groove 35 as the robot 20 moves away from the transfer vehicle 30. The extremity of the cable 33 is plugged in through a connector, not shown, to the onboard logic system 36 shown in FIGS. 2 and 4. An advantage of the drum construction is that the cable 33 is automatically guided onto the drum 34 by the groove 35. This, combined with the fact that only a single winding is required, eliminates the need for a level wind mechanism which continually reels the cable back and forth on the drum in a multiplicity of windings. Such mechanisms are very complex in construction and have very costly components. FIG. 3 further shows the rails 11 which include the upper load bearing surfaces 13 and the lower wheel bearing surfaces 15. The lower portion of the rails 11 also includes a vertical edge 17 which is adapted to be contacted by a plurality of guide wheels 24. The guide wheels 24 are located on each corner of the vehicle and are adapted to engage the rail surfaces 17 to ensure that the vehicle 20 remains centered at all times during travel along the rails 11. The advantage of having the guide wheels 24 located at the corners of the vehicle 20 is that the guide wheels will sense any change of direction or misalignment of the rails and will make the proper corrections in the vehicle travel before the rest of the vehicle passes therethrough.

FIG. 3 also shows the lift mechanism 23, shown in solids in its extended position for carrying the loaded pallet 14. The lowered or retracted position of the lift mechanism 23 is shown in dotted lines. This position is utilized when the vehicle is empty and not carrying any loaded pallets.

FIG. 4 illustrates a plan view of the vehicle 20 which is formed by a pair of rectangular side chambers 37 and 38 separated by a plurality of shafts 43, 44 and 45, respectively.

A shaft 42 functions to support the drum 34. Shaft 43 functions a pivot support for two pairs of double eccentrics 47 of the lift mechanism, the operation of which will be described hereinafter. Shafts 44 and 45 are the vehicle drive shafts and are interconnected to the rear wheels 19 and are rotatively driven by the drive motor 21 via a gear train assembly 48. The shaft 43 is rotatively driven by the drive motor 22 via a gear train assembly 49 to rotate on command the double eccentrics 47.

FIGS. 5 and 6 illustrate the lift mechanism which includes the support bar 23 which is mounted on a pair of vertical support elements 51. The support elements 51 are movable within cavities 52 and include grooves 53 (FIG. 4) which extend over guide rollers 54. The support elements 51 on each side of the vehicle are adapted to be raised and lowered within the cavities 52 by a pair of chains or flexible tension members 55 and 56. These chains 55 and 56 are anchored at points 57 and are adapted to extend around one of the surfaces of the double eccentrics 47. The chains 55 and 56 further extend around pulleys 58 to be connected to the support elements 51. The rotation of the eccentrics 47 by the drive motor 22 causes the eccentrics to move laterally and causes chains 55 and 56 to lengthen or shorten the effective distance of the chains between the anchors 57 and the pulleys 58. This lengthening and shortening of the effective distance of the chains 55 and 56 causes the support elements 51 to be raised and lowered.

FIGS. 7 and 8 illustrate other views of the vehicle and lift drive assemblies. In FIG. 7, the cable drum drive is illustrated. In this assembly, a sprocket 59 is attached to drive shaft 60, while a second counter-rotating sprocket 61 is attached to the shaft 44. Because of the ratio of the gears in the gear train 48, the tangential speed of the sprockets 59 and 61 are approximately the same. These sprockets 59 and 61, in turn, are drivingly connected, via a pair of chains 63 and 64, to a pair of sprockets 65 and 66 located on the drum shaft 42, which drives the cable drum 34. Each sprocket 65 and 66 has a one-way, built-in clutch in order to be able to drive in one direction only. The shaft 42 is connected through a torque limiting device to the cable drum 34, and both the shaft and the drum are adapted to be driven in the winding direction to take up the cable by either of the sprockets 65 and 66, depending on the direction of travel of the vehicle and the rotation of the sprockets 65 and 66. A magnetic clutch (not shown) is also provided between the drum 34 and the shaft 42 to function as an override when the vehicle 20 is moving away from the carriage 30 and when the cable 33 is being paid out from the drum 34.

It should be noted that various modifications can be made to the assembly while still remaining within the purview of the following claims.

What is claimed is:

1. A load transporting system comprising:
   (a) a movable vehicle;
   (b) means for moving said vehicle along a first predetermined path;
   (c) substantially horizontally disposed lift means mounted on said movable vehicle to raise or lower a load with respect thereto;
   (d) a plurality of flexible members each extending along second predetermined paths and each having a respective first end and a respective second end;
   (e) first connecting means interconnecting said lift means and said flexible members proximate said respective first ends of said flexible members;
   (f) second connecting means interconnecting said movable vehicle and said flexible members proximate said respective second ends of said flexible members;
   (g) eccentric means carried by said vehicle for rotation in a predetermined rotative direction;
   (h) said eccentric means further including a surface disposed for coaction with said flexible members such that there is a first portion of each of said flexible members extending between said first connecting means and a place at which said flexible members first engage said surface, whereby rotation of said eccentric means in said predetermined rotative direction effects movement of said first portions of said flexible members and effects operation of said lift means for either raising or lowering a load;
   (i) means for driving said eccentric means in said predetermined rotative direction; and
   (j) a plurality of spaced guide means for facilitating passage of said flexible members about said eccentric means;
   (k) said guide means being located between said eccentric means and said first connecting means.

2. A load transporting system as defined in claim 1, wherein each of said guide means for said flexible members comprise a pulley disposed on said movable vehicle between said respective first ends of said flexible members and said eccentric means.

3. A load transporting system as defined in claim 1, further including carriage means for moving in a predetermined direction relative to said vehicle; and means on said carriage means for supporting said vehicle thereon.

4. The load transporting system of claim 1, wherein said second connecting means includes means to selectively adjust the length of said flexible members extending between said first connecting means and said second connecting means.

5. The movable load transporting system of claim 1, wherein said lift means includes at least one load supporting means disposed in a generally horizontal position and at least one support element depending generally downwardly from said load supporting means and being interconnected by said first connecting means to said flexible member.

6. The load transporting system as defined in claim 1, wherein there are four spaced flexible members and said eccentric means comprises two pairs of surfaces, each surface being disposed for coaction with one of said flexible members.

7. A load transporting system as defined in claim 3, wherein a power cable is connected to a remote source for providing electrical signals and power from said carriage means to said movable vehicle, and a cable drum is located on said movable vehicle for receiving said cable.

8. A load transporting system as defined in claim 7, wherein said cable drum has a single helical groove formed on its surface for receiving said cable in a single winding.

9. A load transporting system as defined in claim 8, further including means for driving said cable drum to wind the cable onto the drum.

* * * * *